United States Patent [19]

St. André et al.

[11] 4,031,446

[45] June 21, 1977

[54] MACHINE TOOL

[75] Inventors: Arthur Francis St. André, Marlboro; Joseph David LeBlanc, Holden; Edward George Robillard, Cherry Valley, all of Mass.

[73] Assignee: Cincinnati Milacron-Heald Corporation, Worcester, Mass.

[22] Filed: July 31, 1975

[21] Appl. No.: 600,903

Related U.S. Application Data

[63] Continuation of Ser. No. 395,917, Sept. 10, 1973, abandoned.

[52] U.S. Cl. .................................. 318/665; 318/571
[51] Int. Cl.² .......................................... G05B 1/06
[58] Field of Search ............. 318/665, 625, 571, 39

[56] References Cited

UNITED STATES PATENTS

| | | | |
|---|---|---|---|
| 3,139,571 | 6/1964 | Tucker et al. | 318/665 |
| 3,215,914 | 11/1965 | Patterson | 318/665 X |
| 3,754,179 | 8/1973 | Waitkoss et al. | 318/665 |

*Primary Examiner*—B. Dobeck
*Attorney, Agent, or Firm*—Norman S. Blodgett; Gerry A. Blodgett

[57] ABSTRACT

A machine tool having an electrical means for producing a non-cylindrical surface of revolution.

5 Claims, 10 Drawing Figures

MACHINE TOOL

This is a continuation of application Ser. No. 395,917 filed Sept. 10, 1973, now abandoned.

BACKGROUND OF THE INVENTION

In the operation of a machine tool, such as a boring machine, it is often necessary to generate a non-cylindrical surface of revolution such as a sphere. This would be true if one were manufacturing the movable element of a ball valve, for instance. In the past, the necessary relative movement between the workpiece and the tool has been brought about by the use of a mechanical template or cam. Another method of accomplishing this purpose is by use of a numerically controlled machine tool, wherein the relative feed motions are brought about in accordance with a signal introduced into the machine from a punched tape or the like. Machine tools that use either the mechanical template or the numerical control method are unwieldy and very expensive. Furthermore, it is difficult to convert from one pattern to another without encountering considerable set-up time. The accuracy of the template method, of course, is tied in with the accuracy of formation of the template; this means that the template is not only expensive, but, when it wears, the form deteriorates. These and other difficulties experienced with the prior art devices have been obviated in a novel manner by the present invention.

It is, therefore, an outstanding object of the invention to provide a machine tool having means for producing accurately and quickly a non-cylindrical surface of revolution.

Another object of this invention is the provision of a machine tool for producing a surface of revolution of curved shape without the use of a mechanical template or of a numerically controlled feed mechanism.

A further object of the present invention is the provision of a machine tool for producing a non-cylindrical surface of revolution, which machine is inexpensive to manufacture and which may be readily operated without difficulty by an ordinary skilled machinist.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a base, having a workhead mounted on the base, and having a toolhead mounted on the base. A first means is provided for causing movement in a first direction between the toolhead and the workhead and a second means is provided for producing relative movement between the workhead and the toolhead in a second direction perpendicular to the first direction. A potentiometer is provided having two non-linear resistance portions and a contactor associated with each portion. A motor drives the contactors together at the same speed, thus causing the potentiometer to develop two separate electrical signals; each signal varies in accordinace with the nature of its respective portion.

More specifically, the first means and the second means each includes an electrical servo-motor receiving a signal from one of the portions and operating through a ball-screw mechanism to produce the said respective relative movement between the workhead and the toolhead.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
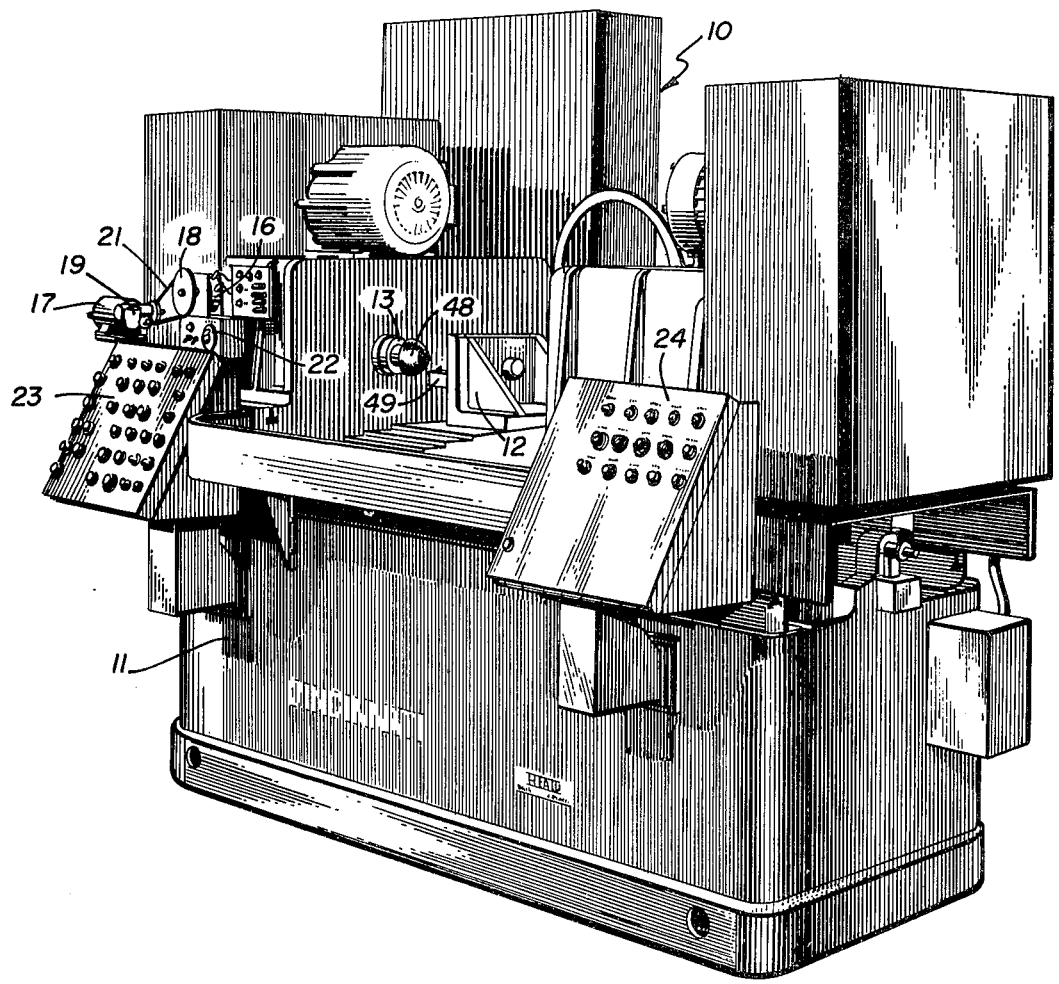
FIG. 1 is a perspective view of a machine tool embodying the principles of the present invention.
Figure 2:
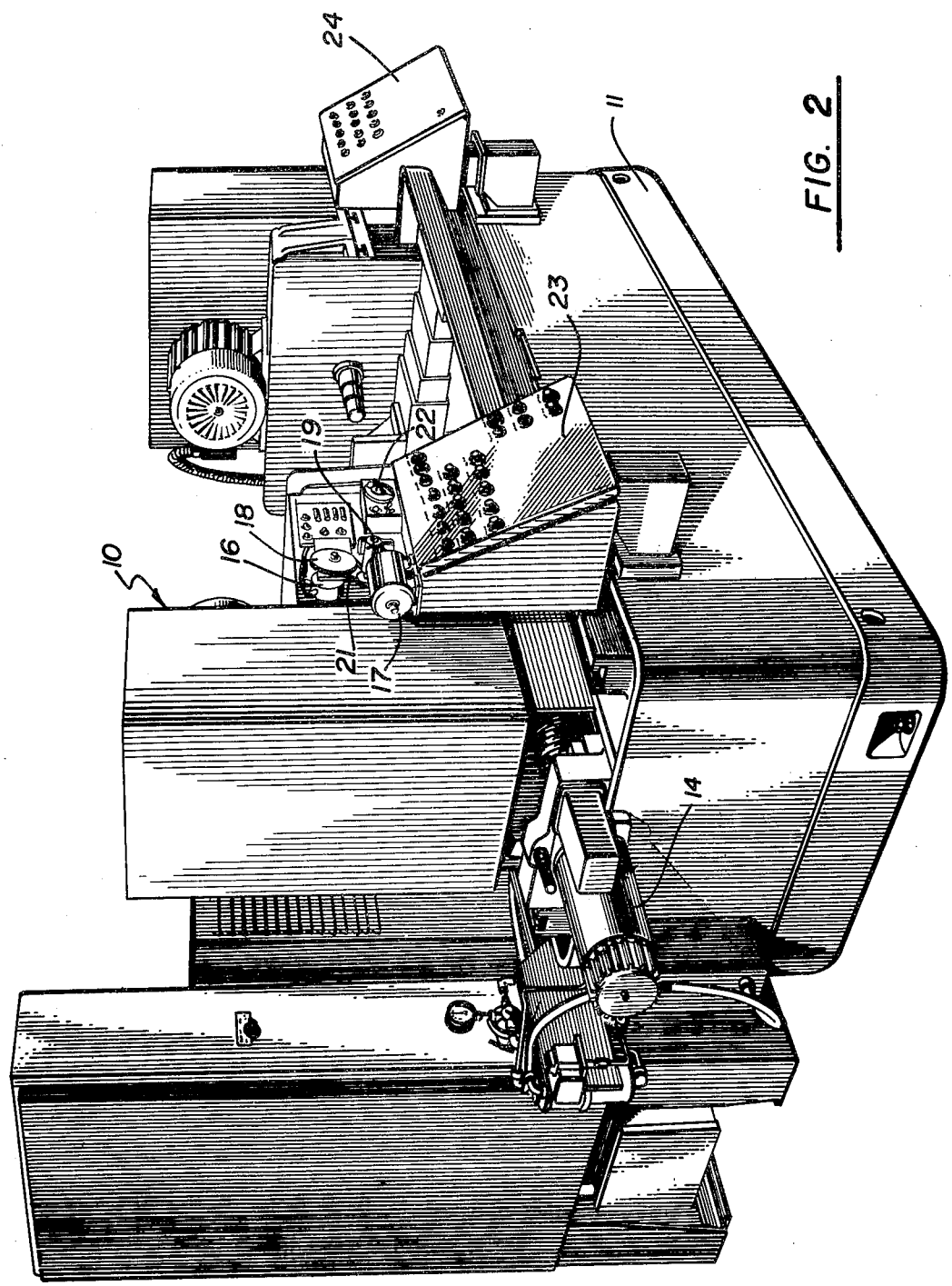
FIG. 2 is another perspective view of the machine tool from another end direction.
Figure 3:
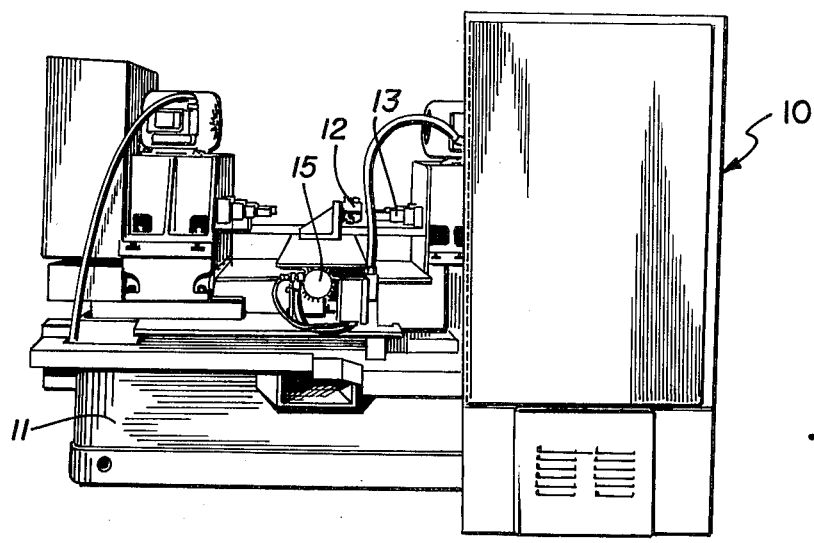
FIG. 3 is a perspective view of the machine tool taken from the rear.

Referring first to FIGS. 1 and 2, wherein are best shown the general features of the invention, the machine tool, indicated generally by the reference numeral 10, is shown as having a base 11 on which are mounted a toolhead 12 and a workhead 13. A first means, including a constant torque motor 14, operates to bring about relative motion between the workhead 13 and the toolhead 12 in a direction longitudinal of the table, this being the direction of the axis of the surface of revolution to be formed. Similarly, referring to FIG. 3, a second means, including a constant torque motor 15, operates to bring about relative movement of the workhead 14 and the toolhead 13 in a direction which is transverse of the base and which is, therefore, perpendicular to the axis of the surface of revolution. The details of the motor 14 and the manner in which it operates through a ball-screw mechanism are shown and described in the patent application of Wake et al Ser. No. 339,705, filed Mar. 9, 1973. The cross-feed motor 15 is similarly operated through a ball-screw mechanism. A potentiometer 16 is mounted on the base and it is provided with two non-linear resistance portions and a contactor associated with each (see FIG. 5). Contactors are driven by a motor 17 operating on a pulley 18 mounted on the shaft of the contactors. The motor drives the pulley through the medium of a gear reduction unit 19 and a timing belt 21. The speed of the motor 17 is regulated by a control. The motor 17 drives the potentiometer contactors together, thus causing the potentiometer to develop two separate electrical signals, each signal varying in accordance with the nature of its respective portions. These signals are connected each to one of the motors 14 and 15 to regulate their motion.

In other words, each of the electrical servo-motors 14 and 15 receives a signal for one of the said portions of the potentiometer and operates through a ball-screw mechanism to produce its respective relative movement between the workhead and the toolhead.

Figure 4:
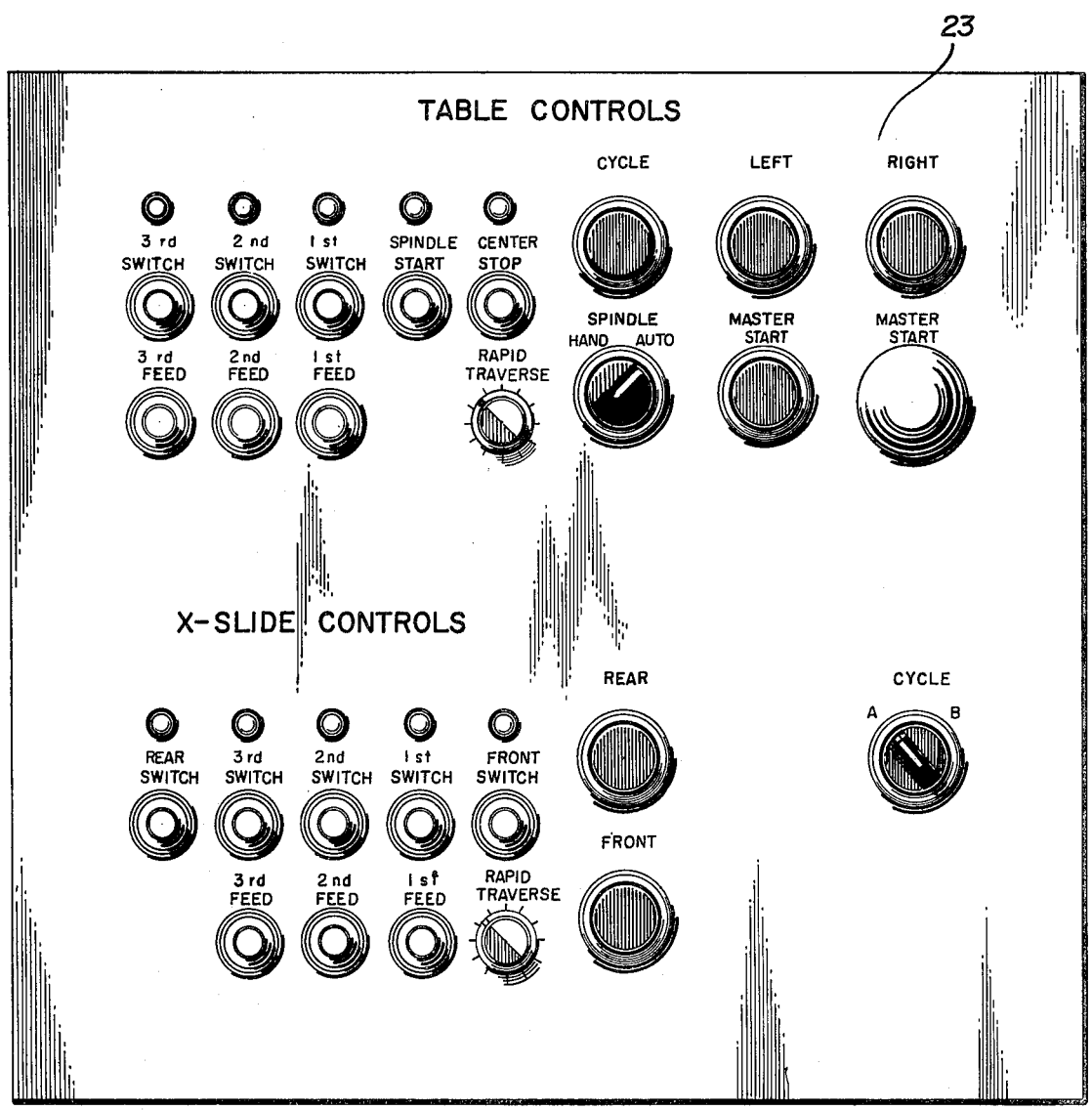
FIG. 4 is an enlarged view of a control panel forming part of the machine tool.

FIG. 4 shows the details of a control panel 23 mounted at the left side of the machine tool. The upper portion labeled TABLE CONTROL is duplicated in the control panel 24 at the right-hand side of the machine tool. The control panel and the controls associated therewith, operate to regulate the cycle in the manner shown and described in the aforementioned patent application of Wake et al. Ser. No. 339,750.

Figure 5:
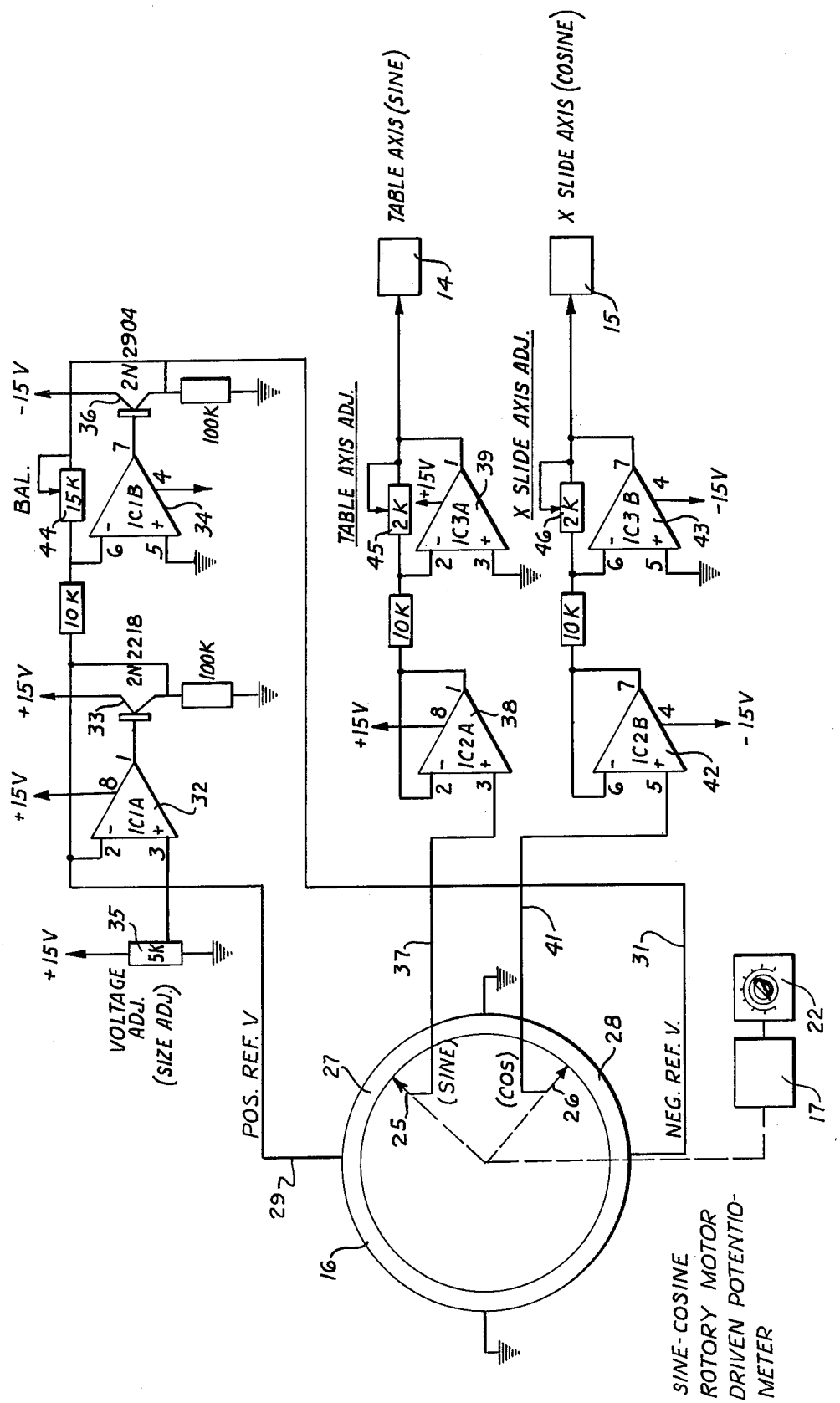
FIG. 5 is an electrical schematic diagram of a portion of the machine tool.

FIG. 5 shows the electronic circuitry which passes the electrical signal from the potentiometer 16 to the motors 14 and 15. The motor 17 is connected to the contactors 25 and which operate on the porions 27 and 28, respectively, of the resistance element of the potentiometer. A positive reference voltage is brought into the potentiometer through a line 29, while a negative reference voltage is brought in on a line 31. These lines are connected to a circuit, including an operational amplifier 32, a 2N2218 transistor 33, and an operational amplifier 34. The amplifier 32 receives a positive voltage from a potentiometer 35, which receives a + 15volt DC signal. The output of the amplifier 34 is connected to a 2N2904transistor 36.

Figure 6:
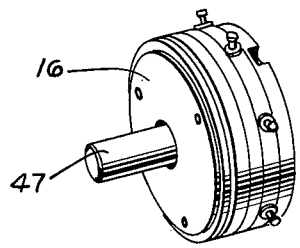
FIG. 6 is a perspective view of a potentiometer forming part of the machine tool.
Figure 7:
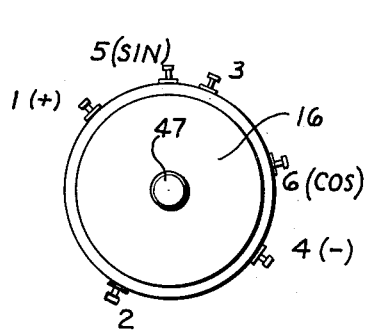
FIG. 7 is an end elevational view of the potentiometer.
Figure 8:
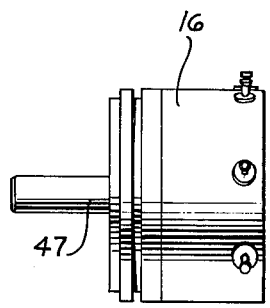
FIG. 8 is a side elevational view of the potentiometer.
Figure 9:
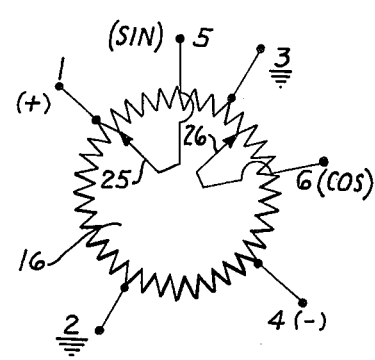
FIG. 9 is an electrical schematic diagram of the potentiometer.

The contactor 25 is connected by a line 37 to an operational amplifier 38, which, in turn, is connected to an operational amplifier 39 whose output is connected to the motor 14. The voltage received by the motor 14 results in a speed proportional to the absolute value of the voltage. The contactor 26 is connected by a line 41 to an operational amplifier 42, whose output is connected to the input of an operational amplifier 43, whose output is connected to the cross-slide motor 15. This direct current servo-drive motor rotates at a speed proportional to the absolute value of the voltage presented to it. It can be seen that the values of the voltages that appear at the motor can be changed, first of all, by adjusting the potentiometer 35; also by changing the speed of the potentiometer drive motor 17 by means of the control 22. Other adjustments are available throughout the circuit as is obvious from an examination of the schematic drawing. For instance, the operational amplifier 34 and a transistor 36 are connected in a variable resistance 44 for the purpose of balancing the voltage appearing on the lines 29 and 31. The operational amplifier 39 is provided with an adjustable resistance 45, while the operational amplifier 43 is provided with a similar adjustable resistance 46. FIGS. 6, 7, 8, and 9 show the details of the potentiometer 16. The physical characteristics are shown in FIGS. 6, 7, and 8 which indicates that the potentiometer is generally drum-shaped with a drive shaft 47 adapted to receive the pulley 18 and to cause the contactors 25 and 26 to sweep over their resistance portions. FIG. 9 shows schematically how the electrical portions of the potentiometer are built.

The operation of the invention will now be readily understood in view of the above description. A workpiece 48 is inserted in the workhead 13 and a tool 49 of the single point type is inserted in the toolholder 12. The workpiece is rotated, while the tool is brought into engagement with the workpiece 48 to form the surface. In the case where the desired surface is a sphere, the following mathematics applies.

Figure 10:
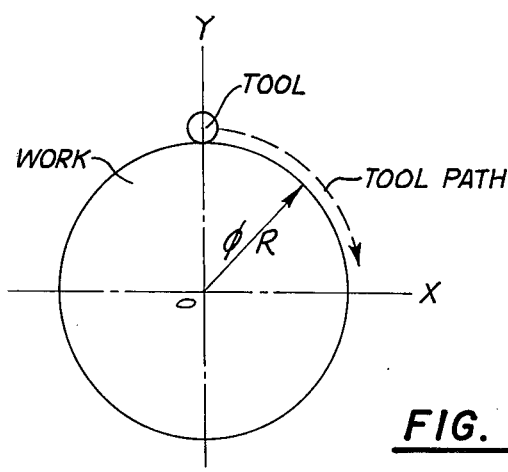
FIG. 10 is a geometric diagram demonstrating the method of operation of the machine tool.

$\theta = \omega t$ where $\omega =$ rad./min.
$x = R \sin \omega t, y = R \cos \omega t$
$\dot{x} = R\omega \cos \omega t, \dot{y} = -R\omega \sin \omega t$
for a 4 inch sphere $R = 2$ inches
$x = 2 \sin \omega t, y = 2 \cos \omega t$
$\dot{x} = 2\omega \cos \omega t, \dot{y} = -2 \sin \omega t$
$x = 0, \omega t = 0$  $y=0, \omega t=\pi/2$ rad.
$\dot{x} = 2\omega (1)$  $\dot{y}=-2\omega \sin \pi/2$
$y = 0, \omega t = \pi/2$ rad.
$\dot{y} = -2\omega \sin \pi/2$ The formula shoud be read in connection with the diagram on FIG. 10 and, as it can be seen, a perfect shpere can be generated by maintaining the relationships shown in the equations.

The $\dot{x}$ and $\dot{y}$ are the values which must be presented to the motors 14 and 15, respectively, to obtain a perfect sphere, which in the example given, is a 4 inch sphere. These values can be set in the apparatus, including the potentiometer 16, and the rotation of the motor 17 causes these relationships to be maintained, as the workpiece 48 is rotated by the workhead 13.

The construction of the machine tool 10 will be of interest. In the preferred embodiment, the machine is shown as a horizontal boring machine and hydraulic power components have been eliminated. The power unit, the table and the cross-slide cylinders, control valves, cams and switches, tubing and fittings have all been replaced by electric actuators controlled by a reed relay logic system. In the table/cross-slide control circuit, signals are sent to the reed relay logic any time the voltage value from a variable resistor driven by the ball-screw actuator balances with the voltage setting of a control switch which is set by the operator. For any table position within its stroke range, the operator can set one of five control knobs to perform (or change) a table function. The five basic functions on the control are: table "out" or center stop, spindle start, first feed, second feed, and third feed (or back feed). Feed rates are also set at the control panel 23. Since heat is one of the enemies of precision machining, and the removal of the hydraulic cylinder from beneath the machine table does reduce temperature rise during extended operations, extreme accuracy possible. The electric motor which powers the ball-screw mechanism is externally mounted and eliminates virtually all heat from the machine base and table. The benefits from the use of the electric actuator drive system include faster rapid traverse rates, stable slow feed rates, and higher thrust capabilities for both table and cross-slide. The elimination of hydraulics, except for lubrication, has two benefits; it eliminates maintenance of a hydraulic system and provides a clean dry work area at the time.

It can be seen then, that by use of the present apparatus, it is possible to obtain very inexpensively any desired surface of revolution whose surface can be analogued in the findings of the potentiometer 16.

It is obvious that minor changes can be made in the form and construction of the invention without departing from the material spirit thereof. It is not, however, desired to include all such as properly come within the scope claimed.

The invention having been thus described, what is claimed as new and desired to secure by Letters Patent is:

1. A machine tool, comprising
   a. a base,
   b. a workhead mounted on the base,
   c. a toolhead mounted on the base,
   d. a first means for producing relative movement in a first direction between the workhead and the toolhead, said first means including a constant-torque motor,
   e. a second means for producing relative movement between the workhead and the toolhead in a second direction perpendicular to the first direction, said second means including a constant-torque motor, the first means and the second means each including an electrical servo motor receiving a signal from one of the said portions and operating through a ball-screw mechanism to produce the said respective relative movement between the workhead and the toolhead, f. a first and second potentiometer portion, at least one portion having non-linear resistance and a contactor associated with each portion, the portions of the potentiometer being circular and concentric with a shaft for driving the contactors, the electrical signal developed by one portion of the potentiometer varying as the sine of the angle of the shaft, while the electrical signal developed by the other portion varies as the cosine of the angle, and g. a motor driving the contactors together at the same constant and predetermined speed, thus causing the potentiometers to develop two separate and continuous electrical signals, each signal varying in accordance with the nature of its respective portion, one signal controlling the speed of one motor and the other signal controlling the speed of the other motor, each motor bringing about the said relative movement at a velocity proportional to the voltage developed by its portion of the potentiometer.

2. A machine tool as recited in claim 1, wherein a positive reference voltage is applied to the potentiometer, is adjustable, and is passed through a circuit including an operational amplifier to produce a negative reference voltage that is also applied to the potentiometer.

3. A machine tool as recited in claim 2, wherein each electrical signal developed by the potentiometer is passed through an operational amplifier before reaching its servo motor.

4. A machine tool as recited in claim 3, wherein each electrical signal is also passed through a second operational amplifier, which second amplifier is provided with a potentiometer to adjust its output signal.

5. A machine tool as recited in claim 4, wherein the potentiometer associated with one of the second amplifiers is used to adjust a table axis, while the potentiometer associated with the other second amplifier is used to adjust a cross-slide axis.

* * * * *